(12) United States Patent
Carty et al.

(10) Patent No.: US 11,556,872 B2
(45) Date of Patent: Jan. 17, 2023

(54) TIME AND EXPENSE TRACKING SYSTEM

(71) Applicant: Florida Power & Light Company, Juno Beach, FL (US)

(72) Inventors: Molly N. Carty, Palm Beach Gardens, FL (US); Iliana M. Rentz, Jupiter, FL (US); Liane M. Sawyer, Miami, FL (US); Matthew R. Moxley, Palm City, FL (US); Kristin M. Manz, Jupiter, FL (US)

(73) Assignee: Florida Power & Light Company, Juno Beach, FL (US)

( * ) Notice: Subject to any disclaimer, the term of this patent is extended or adjusted under 35 U.S.C. 154(b) by 188 days.

(21) Appl. No.: 16/919,699

(22) Filed: Jul. 2, 2020

(65) Prior Publication Data

US 2021/0004750 A1   Jan. 7, 2021

Related U.S. Application Data

(60) Provisional application No. 62/870,921, filed on Jul. 5, 2019.

(51) Int. Cl.
| | | |
|---|---|---|
| *G06Q 10/06* | (2012.01) | |
| *G06Q 40/00* | (2012.01) | |
| *G06Q 20/40* | (2012.01) | |
| *G06Q 10/10* | (2012.01) | |
| *G06Q 50/06* | (2012.01) | |

(52) U.S. Cl.
CPC . *G06Q 10/063114* (2013.01); *G06Q 10/0633* (2013.01); *G06Q 10/1091* (2013.01); *G06Q 20/40145* (2013.01); *G06Q 40/125* (2013.12); *G06Q 50/06* (2013.01)

(58) Field of Classification Search
CPC ....... G06Q 10/063114; G06Q 10/0633; G06Q 10/1091; G06Q 20/40145; G06Q 40/125; G06Q 50/06; G06Q 20/0855; G06Q 20/127; G06Q 20/145; G06Q 20/32; G06Q 20/405
USPC .......................................................... 705/32
See application file for complete search history.

(56) References Cited

U.S. PATENT DOCUMENTS

| | | | |
|---|---|---|---|
| 2020/0184556 A1* | 6/2020 | Cella | G06Q 30/0206 |
| 2020/0294128 A1* | 9/2020 | Cella | G06Q 20/405 |

* cited by examiner

*Primary Examiner* — Garcia Ade
(74) *Attorney, Agent, or Firm* — Fleit Intellectual Property Law; Jon Gibbons

(57) ABSTRACT

A computer-implemented method and system that operates on a server includes a time and expense management interface for obtaining crew specific information for crews maintaining a utility distribution system. The server is coupled to a wireless communication infrastructure for receiving crew specific information. A portable electronic device receives a selection of a crew with members. The portable electronic device receives the identifier of the at least one or more members of the crew. Once verified, the portable device receives time entries and expense entries, for the at least one or more members of the crew. Business rules are applied to the time entries and expense entries. Once the business rules are satisfied, the time entries and expense entries are stored on the portable electronic device. When the portable electronic device is in proximity to the wireless communication infrastructure, the crew specific information is transmitted to server.

20 Claims, 19 Drawing Sheets

| MEMBERS | RULES | IMAGES | TIMES | EXPENSES | LOCATIONS |
|---|---|---|---|---|---|
| MEMBER 1 | ST1 OT1 DT1 | IMAGE 1A<br>IMAGE 1B<br>IMAGE 1C<br>...<br>IMAGE 1N | HR1A:MM1A<br>HR1B:MM1B<br>HR1C:MM1C<br>...<br>HR1N:MM1N | EXPENSE1A:<br>EXPENSE1B:<br>EXPENSE1C:<br>...<br>EXPENSE1N | LAT1A,LON1A<br>LAT1B,LON1B<br>LAT1C,LON1C<br>...<br>LAT1N,LON1N |
| MEMBER 2 | ST2 OT2 DT2 | IMAGE 2A<br>IMAGE 2B<br>IMAGE 2C<br>...<br>IMAGE 2N | HR2A:MM2A<br>HR2B:MM2B<br>HR2C:MM2C<br>...<br>HR2N:MM2N | EXPENSE2A:<br>EXPENSE2B:<br>EXPENSE2C:<br>...<br>EXPENSE2N | LAT1A,LON1A<br>LAT1B,LON1B<br>LAT1C,LON1C<br>...<br>LAT2N,LON2N |
| ... | ... | ... | ... | ... | ... |
| MEMBER N | STN OTB DTB | IMAGE NA<br>IMAGE NB<br>IMAGE BC<br>...<br>IMAGE NN | HR3A:MM1A<br>HR3B:MM1B<br>HR1C:MM1C<br>...<br>HRNN:MMNN | EXPENSE3A:<br>EXPENSE3B:<br>EXPENSE1C:<br>...<br>EXPENSENN | LAT3A,LON1A<br>LAT3B,LON1B<br>LAT3C,LON1C<br>...<br>LATNN,LONN |

702' SELECT SITE
- D
- DAYTONA SPEEDWAY
- F
- FAIRGROUNDS
- M
- MIAMI ZOO

FIG. 7C

706' COMPANY REPRESENTATIVE
- B
- SHAWNA BRINSON
- C
- PRITHARAJ CHAMALA
- MOLLY CARTY

FIG. 7A

< 5/22/2019   HURRICANE IRMA
TRAVEL TEAM ID: 3phaCe

TIME REPORT      82 HOURS >
EXPENSES         $0.00 >
STAGING SITE                    — 702
IS TRAVELLING                   — 704
PL/TC                           — 706
REPORT STATUS    CREATED

| < 5/22/2019  HURRICANE IRMA |
|---|
| TRAVEL TEAM ID: 3phaCe |
| 👥 TIME REPORT      82 HOURS  > |
| 🧾 EXPENSES         $0.00  > |
|                     820 |
| ✈ STAGING SITE      STAGING SITE  > |
| ✈ IS TRAVELLING      ◯ |
| 🏢 PL/TC            MOLLY CARTY  > |
| ⓘ REPORT STATUS    CREATED |
|  |
| SUBMIT |

| ⊗ EXPENSES         ADD |
|---|
| NO EXPENSES |

| <        EDIT EXPENSE        SAVE |
|---|
| TYPE                    824 ⤴ |
| REASON                  826 ⤴ |
| AMOUNT                  $0.00 |
| |
| 1    2    3 |
| 4    5    6 |
| 7    8    9 |
| .    0    ⌫ 828 |

FIG. 8C

| ⊗ SELECT TYPE |
|---|
| GAS |
| LODGING |
| MEALS |
| EQUIPMENT |
| OTHER |

| ⊗ SELECT REASON |
|---|
| HOTELS NOT AVAILABLE/PROVIDED |
| EQUIPMENT NECESSARY FOR WORK |
| NOT AVAILABLE AT STAGING SITE |
| MOB/DEMOB ALLOWABLE COSTS |
| PER FPL/GULF DIRECTION |

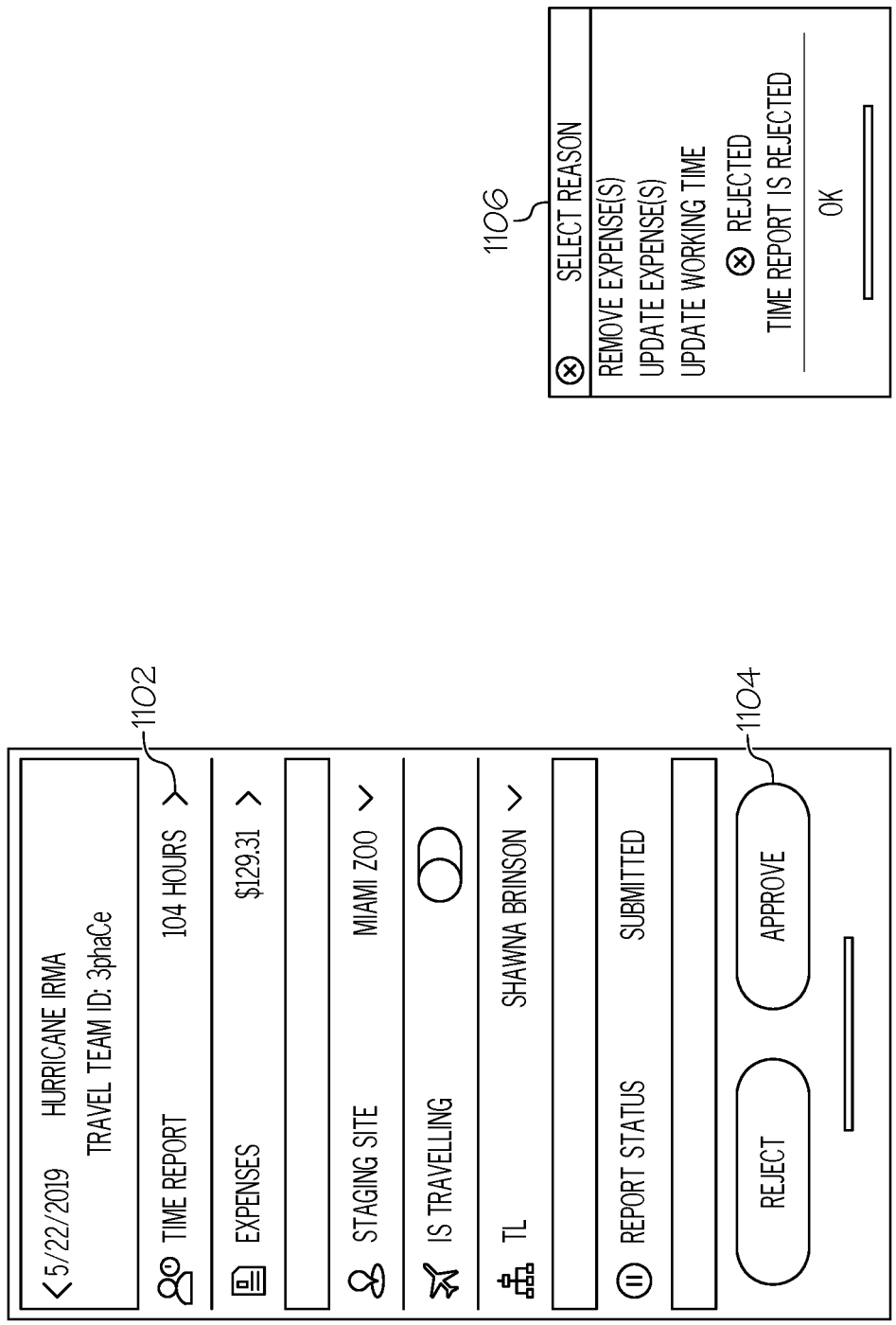

| WORK | TRAVELING | STAND-BY | TOTAL |
|---|---|---|---|
| RAINEY WILKINS<br>CONTRACTOR 1 | | | ✏ |
| ST OT DT<br>4.0 2.0 2.0 | ST OT DT<br>2.0 2.0 2.0 | ST OT DT<br>2.0 1.0 1.0 | TLT<br>18.0 |
| JOSEPH PARSONS<br>CONTRACTOR 2 | | | ✏ |
| ST OT DT<br>4.0 2.0 2.0 | ST OT DT<br>2.0 2.0 2.0 | ST OT DT<br>2.0 1.0 1.0 | TLT<br>18.0 |
| WILLIAM TULIP<br>CONTRACTOR 3 | | | ✏ |
| ST OT DT<br>4.0 2.0 2.0 | ST OT DT<br>2.0 2.0 2.0 | ST OT DT<br>2.0 1.0 1.0 | TLT<br>18.0 |
| WALKER JOHNSON<br>CONTRACTOR 4 | | | ✏ |
| ST OT DT<br>4.0 2.0 2.0 | ST OT DT<br>2.0 2.0 2.0 | ST OT DT<br>2.0 1.0 1.0 | TLT<br>18.0 |

FIG. 15A

| WORK | TRAVELING | STAND-BY | TOTAL |
|---|---|---|---|
| RAINEY WILKINS<br>CONTRACTOR 1 | | | ✏ |
| ST OT DT<br>4.0 2.0 2.0 | ST OT DT<br>2.0 2.0 2.0 | ST OT DT<br>2.0 1.0 1.0 | TLT<br>18.0 |
| JOSEPH PARSONS<br>CONTRACTOR 2 | | | ✏ |
| ST OT DT<br>4.0 2.0 2.0 | ST OT DT<br>2.0 2.0 2.0 | ST OT DT<br>2.0 1.0 1.0 | TLT<br>18.0 |
| WILLIAM TULIP<br>CONTRACTOR 3 | | | ✏ |
| ST OT DT<br>4.0 2.0 2.0 | ST OT DT<br>2.0 2.0 2.0 | ST OT DT<br>2.0 1.0 1.0 | TLT<br>18.0 |
| WALKER JOHNSON<br>CONTRACTOR 4 | | | ✏ |
| ST OT DT<br>4.0 2.0 2.0 | ST OT DT<br>2.0 2.0 2.0 | ST OT DT<br>2.0 1.0 1.0 | TLT<br>18.0 |

BULK HOURS — SAVE

| | ST | OT | DT | T |
|---|---|---|---|---|
| BULK WORKING | 4.0 | 2.0 | 2.0 | 8.0 |
| BULK TRAVELING | 2.0 | 2.0 | 2.0 | 6.0 |
| BULK STAND-BY | 2.0 | 1.0 | 1.0 | 4.0 |

APPLY — 1502

DONE

| 1 | 2 | 3 |
|---|---|---|
| 4 | 5 | 6 |
| 7 | 8 | 9 |
| +*# | 0 | ⌫ |

FIG. 15C

CONTRACTOR NAME — SAVE

| | ST | OT | DT | T |
|---|---|---|---|---|
| WORKING | 4.0 | 2.0 | 2.0 | 8.0 |
| TRAVELING | 2.0 | 2.0 | 2.0 | 6.0 |
| STAND-BY | 2.0 | 1.0 | 1.0 | 4.0 |

APPLY — 1504

DONE

| 1 | 2 | 3 |
|---|---|---|
| 4 | 5 | 6 |
| 7 | 8 | 9 |
| +*# | 0 | ⌫ |

TIME AND EXPENSE TRACKING SYSTEM

CROSS-REFERENCE TO RELATED APPLICATIONS

This application claims priority from and is related to the following prior application U.S. Provisional Application No. 62/870,921, filed Jul. 5, 2020 entitled "Time and Expense Tracking System." This prior application, including the entirety of the written description and drawing figures, is hereby incorporated into the present application by reference.

FIELD OF THE DISCLOSURE

The present disclosure generally relates to tracking time and expense and more specifically to tracking time and expense of contract workers installing, repairing, and restoring repairing utility distributions systems.

BACKGROUND

Organizations that maintain and operate various utility distribution systems, such as, electrical power distribution and/or transmission systems, cellular, telecommunications, cable TV, water and sewer, natural gas and others, are generally responsible for maintaining and operating a large number of devices or objects that are distributed across a large geographic area. In order to repair distribution systems organizations will hire private contractors and other utility operators to help with installing, repairing, and restoring distribution systems. This is especially true after large disruptive events, such as, winter storms, hurricanes, tornadoes, floods, fires, and earthquakes. Keeping track of repair teams is often done by paper and pencil because cellular and other service may not operate reliably, particularly when electric power distribution system is down. Addressing issues with particular components, parts, and sub-systems and maintaining the operations of utility systems is a challenge. It can also be a challenge when documenting time and expense for government agencies, such as public utility commissions.

SUMMARY OF THE INVENTION

The present invention provides a novel system and method for capturing time and expense reporting. The time and expense reporting is for utility distribution systems, such as, electrical power distribution and/or transmission systems, cellular, telecommunications, cable TV, water and sewer, natural gas and others. These utility distribution systems include a large number of devices or objects that are distributed across a big geographic area.

The present invention replaces paper and pencil systems that were necessary after a large disruptive event, such as such as, winter storms, hurricanes, tornadoes, floods, fires, and earthquakes because power was not working reliably and cellular communications and other wireless communication is down.

A combination of business rules on a portable electronic device and rules on the server helps to ensure that time and expense reporting is accurate and timely. The user interface may use color schemes to help the crew understand when business rules are in compliance for time and expense entries. Crew identifiers, such as, facial recognition, finger print recognition, and near field communications tags, are used to authenticate the crew working on repairs. Pictures of vehicles, including identifiers such as VINs and GPS coordinates helps to ensure accurate records. Authorized GPS locations may be tied to equipment location, staging areas and other known GPS coordinates. Rosters may be pre-populated on the portable electronic device ahead of time from a central server. This pre-population reduces transcription errors for worker crew member's names. Further the pre-population reduces duplicate entries of names, such as a given legal name and nicknames which are often counted twice.

In one example, GPS is used to calculate mileage for the crew vehicle to predict when refueling is necessary. The prediction of fuel consumption is cross-correlated with expense entries for fuel. In some cases, a re-fueling truck is automatically deployed to meet the crew vehicle and/or more fuel automatically ordered. Crew vehicles returning to staging areas can be automatically routed using control signals to ground crew, signs and gates to direct the vehicle to refueling.

GPS may also be used to calculate estimated time of arrival (ETOA) of the crew at a work site. This ETOA is used to help cross-correlate categories of different time entries, e.g. travel time and work time and standby time.

The present invention helps to document time and expense for government agencies, such as public utility commissions. This documentation is often used to assist with setting special charges on customer invoices.

More specifically disclosed is a novel computer-implemented method and system that operates on a server includes a time and expense management interface for obtaining crew specific information for crews maintaining a utility distribution system. The crew specific information includes an identifier of one or more members of a crew in the plurality of crews and time entries and/or expense entries, the identifier i) biometric data and/or ii) a personal identifier of the at least one or more members of the crew. The server is coupled to a wireless communication infrastructure for receiving the crew specific information.

A portable electronic device receives a selection of a crew with the member. The portable electronic device includes a transmitter for transmitting collected data to the server over the wireless communication infrastructure. The portable electronic device receives the identifier of the at least one or more members of the crew. The identifier is verified. Once verified, the portable device receives time entries and expense entries, for the at least one or more members of the crew, the time entries including a date, hours worked, and a category of time. Business rules are applied to the time entries and expense entries. Once the business rules are satisfied, the time entries and expense entries are stored on the portable electronic device. When the portable electronic device is in proximity to the wireless communication infrastructure, the crew specific information is transmitted to the time and expense management interface.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 3 is a table of example data for time and expense tracking, according to an example;

FIG. 5A thru 5C, FIG. 6A thru 6B, FIG. 7A thru FIG. 7C, FIG. 8A thru FIG. 8E, FIG. 9A thru FIG. 9B, FIG. 10A thru FIG. 10C, FIG. 11A thru FIG. 11B, FIG. 12, FIG. 13, FIG. 14, and FIG. 15A thru FIG. 15C, are example screens of the time and entry process of FIG. 4, according to an example;

DETAILED DESCRIPTION

Example Embodiments

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

Utility Distribution System

Figure 1:
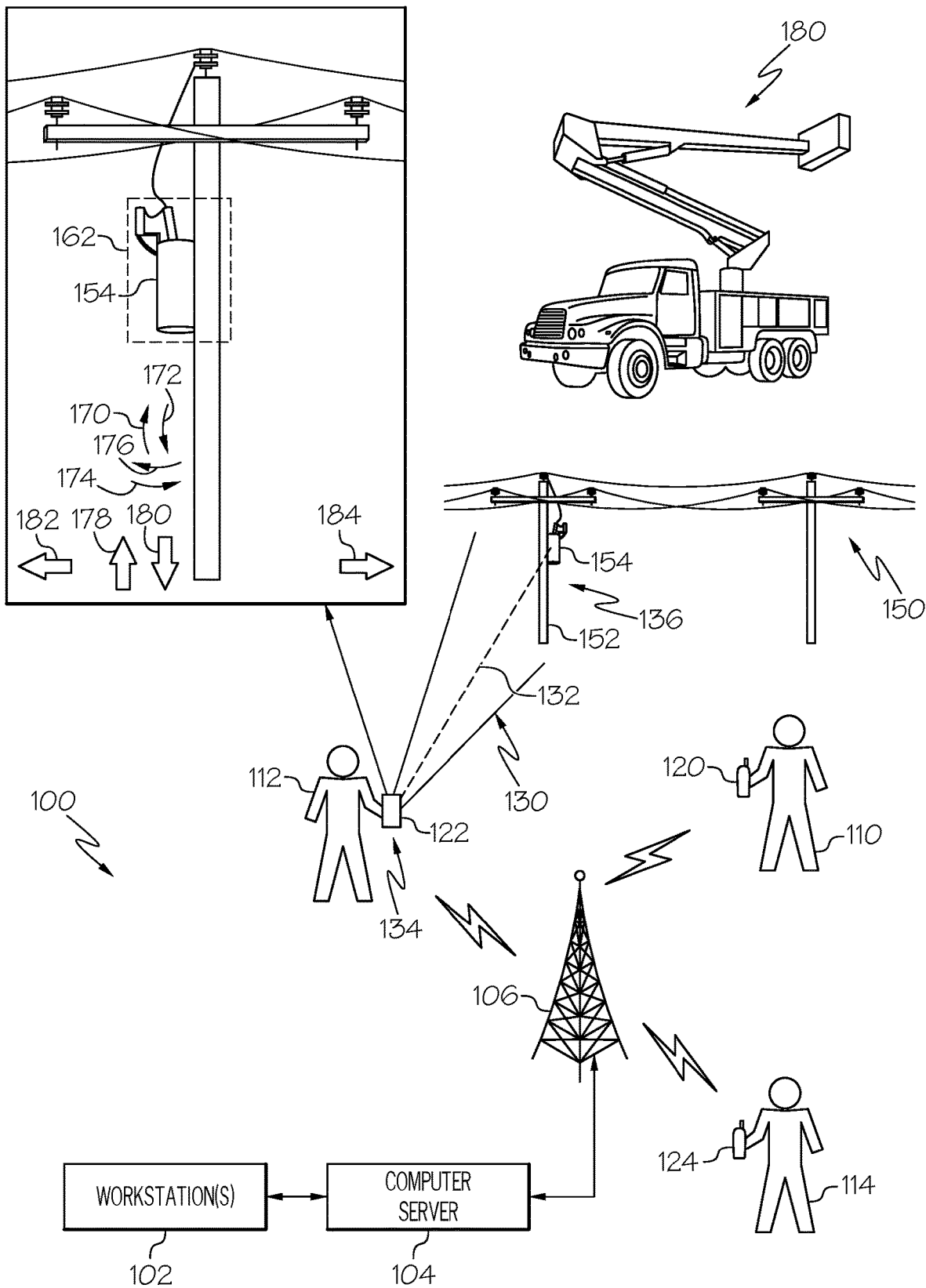
FIG. 1 illustrates a electricity distribution system, according to an example.

FIG. 1 illustrates a utility distribution system 100, according to an example. This is example is an electric utility distribution system, however the present invention is applicable to other distribution systems as well including, cellular, telecommunications, cable TV, water and sewer, natural gas and others. It is to be understood that various implementations are able to include multiples of the illustrated components as well as other components or fewer components than are illustrated in this example.

The utility distribution system 100 includes at least one computer server 104 that controls, coordinates, otherwise facilitates, or combinations of these, the operation of a time management system. The computer server 104 in an example, maintains databases, including workers or members 110, 112, 114 of a given work crew, their images, and business rules. The computer server 104 in one example receives information from members 110, 112, 114 of a given work crew, performs other functions. The computer server 104 sends customized business rules business rules, images of the members of the crew, and other information related to the members of the crew to portable communications device 120, 122, 124 of the members 110, 112, 114. The computer server 104 presents information to operators (not shown). In some examples, parts or all of several of the methods described below are performed by the computer server 104 or a similar computing apparatus.

One or more workstation(s) 102 provide a user interface for operators to interact with the computer server 104 and communicate with members 110, 112, 114 of a given work crew. In some examples, the workstation(s) 102 include graphical displays that are able to present images, videos, alphanumeric information, other information, or combinations of these. Further, the workstation(s) 102 in some examples include facilities to implement audio communications with members 110, 112, 114 of a given work crew. In various examples, an operator at workstation(s) 102 is able to provide indications of the geographic location for observation of selected object, provide ratings for observation data received from members 110, 112, 114 of a given work crew. The computer server 104, in an example, is connected to a wide area wireless communications system 106. The wide area wireless communications system depicted in this example is able to include various components, such as publicly available cellular data communications, other wireless communications, or combinations of these. The wide area wireless communications system 106 in some examples includes a number of radio transmission towers and transceivers to allow wireless communications over a wide area.

An example number of members 110, 112, 114 of a given work crew who each have a portable communications device. In an example, each portable communications device 120, 122, 124 has a camera along with other components to support the operation of the below described systems and methods. In this example a first member 110 with a first communications device 120, a second member 112 with a second communications device that has a member camera 122, and a third member 114 with a third communications device 124. In operation, utility distribution system 100 is able to have any number of members with communications devices. In an example, the wide area wireless communications system 106 supports communications between the computer server 104 and the communications devices held by the various members. In general, the members are able to have similar or different communications devices that each has a camera.

The communications devices for each member, in an example, is able to receive information from the computer server 104, capture observation data such as images, videos, other observation data, or combinations of these, communicate the observation data back to the computer server 104, and support interactions between the member and an operator at a workstation(s) 102 working via the computer server 104. In some examples, the communications devices, such as the first communications device 120, the second communications device that has a member camera 122, and the third communications device 124, each have location equipment to determine and report the present geographic location of that device, and thus the present geographic location of the member associated with that device. In some examples, the location equipment sends reports of the present geographic location that is determined location of its communications device to the computer server 104 for use in determining which members are near a geographic location for observation.

In the following discussion, interactions between the computer server 104 and the members 110, 112, 114 are conducted through a respective communications device that is associated with each member. In an example, each communications device has a camera that is able to capture images, such as images of an object to be observed. In general, a description of sending any information, instructions, offers, other data, or combinations of these to a member is referred to as sending such information, instructions, offers, other data, or combinations of these to a member camera that is associated with that member.

It is important to note that the communication devices 120, 122, and 124 are configured to work completely "off-line" in the event that communications is not available with computer server 104. This is important because disruptive events, such as, hurricanes, often disrupt power distribution systems. The software as will be discussed further below on the communication devices 120, 122, and 124 is designed to work off line and synchronize back up with the computer server 104 at a later time, when communication systems are available.

The utility distribution system 100 depicts a portion of an electrical distribution system 150. The depicted portion of the electrical distribution system includes a pole 152 that has a pole mounted transformer 154. In an example, the three (3) members depicted in the members 110, 112, 114 are in the vicinity of the pole 152. In an example the vicinity of the pole is defined as being a threshold distance from the pole 152. In general, the present camera location 134 and the object location 136 are three-dimensional location values that are precisely determined, such as by GPS receivers. Moreover, the communication devices 120, 122, and 124 may include camera pose angle determination equipment, such as a compass (not shown) to determine an azimuth direction of the pose angle 132 and an accelerometer (not shown) to determine elevation angles of the pose angle 132. Also shown is a utility truck 180. In this example the utility truck 180 is a bucket truck and it includes identifying features, such as a license plate, DOT number, or fleet number, to help identify it in an images.

Augmented Reality to Document Work or Expense

FIG. 1 depicts an image capture display 160 that is presented in this example on a display of the member camera 122. This example may be used to document work and/or an expense. The image capture display 160 includes the captured image of the pole 152 and the pole mounted transformer 154. In the illustrated example, the image capture display 160 further includes various augmented reality image elements that are superimposed on the captured image. In some examples, the augmented reality image elements are provided to give the member 112 instructions for locating or angling the member camera 122 to capture additional images of the object of interest.

In some examples, the augmented reality image elements are provided on the image capture display 160 to reflect and indicate instructions that are generated by an operator at workstation 102 based on receiving images from the member camera 122. In some examples, such instructions direct the member 112, who is operating the member camera 122, to move the location of the member camera 122, change the pose angle of the member camera 122, take other actions, or combinations of these.

The image capture display 160 illustrated in this example presents augmented reality image elements that are direction arrows to direct the member 112, who is operating the member camera 122, to move or re-orient the member camera 122. The illustrated image capture display 160 in this example presents all of the direction arrows that are able to be presented in order to concisely and clearly depict these elements. In general, only one or a few of the possible direction arrows are presented at one time.

The image capture display 160 presents a number of camera pose angle adjustment directions arrows to direct the member 112 to change the camera pose angle in a desired direction. The image capture display 160 includes camera pose angle adjustment direction arrows that include: an up tilt arrow 170; a down tilt arrow 172; a left tilt arrow 174 and a right tilt arrow 176.

The image capture display 160 also presents a number of ground position movement directions arrows to direct the member 112 to move to a different location on the ground. The image capture display 160 includes ground position movement direction arrows that include: a forward movement arrow 178; a backward movement arrow 180; a left movement arrow 182; and a right movement arrow 184.

In an example, which direction arrows that are presented on the image capture display 160 at a particular time reflect differences between the present camera pose angle 132 reported by the member camera 122, the present location of the member camera 122, and a particular pose angle and present location for the member camera 122 that is chosen to capture images of the object to be observed. In an example, some objects may have preferred pose angles for capturing images of, for example, a particular portion of the object. In such an example, which ground position movement direction arrows to be presented on the image capture display 160 are able to be determined based on differences between the present location of the member camera 122, such as are reported by a GPS receiver that is a part of the member camera 122, and a desired location for the accepting member camera 122 that allows capturing images of the object at the preferred pose angle. Pose angle adjustment direction arrows are also able to be determined based upon differences between present pose angle of the member camera 122, such as is reported by a compass and accelerometer in the member camera 122, and the desired pose angle. Further, direction arrows are able to be provided as visual direction feedback on the image capture display to adjust the content of captured images based upon judgment of an operator receiving such images. In some examples, direction arrows are augmented reality instructions that are provided as additional instructions to the member camera where those additional instructions are provided based on receiving an image capture of the object and are instructions for capturing additional images of the object.

In some examples, augmented reality image elements are used to indicate the object of interest of which images are to be captured. In the illustrated example, an object box 162 is superimposed on the captured image to identify the object of interest that is to be observed, i.e., the pole mounted transformer 154 in this example. Object image box 162 may be generated by an image recognition process comparing an image of a known object, i.e. power mounted transformer, with the image from the accepting member camera 122. The image recognition process may be facilitated by analyzing the known location and orientation of accepting member camera 122 and the known location of transformer 154. Such an indication 162 assists the accepting member in locating and/or centering the object of interest in captured images, assists in providing proper focusing of the accepting member camera 122, provides other assistance, or combinations of these.

Major Software Components

Figure 2:
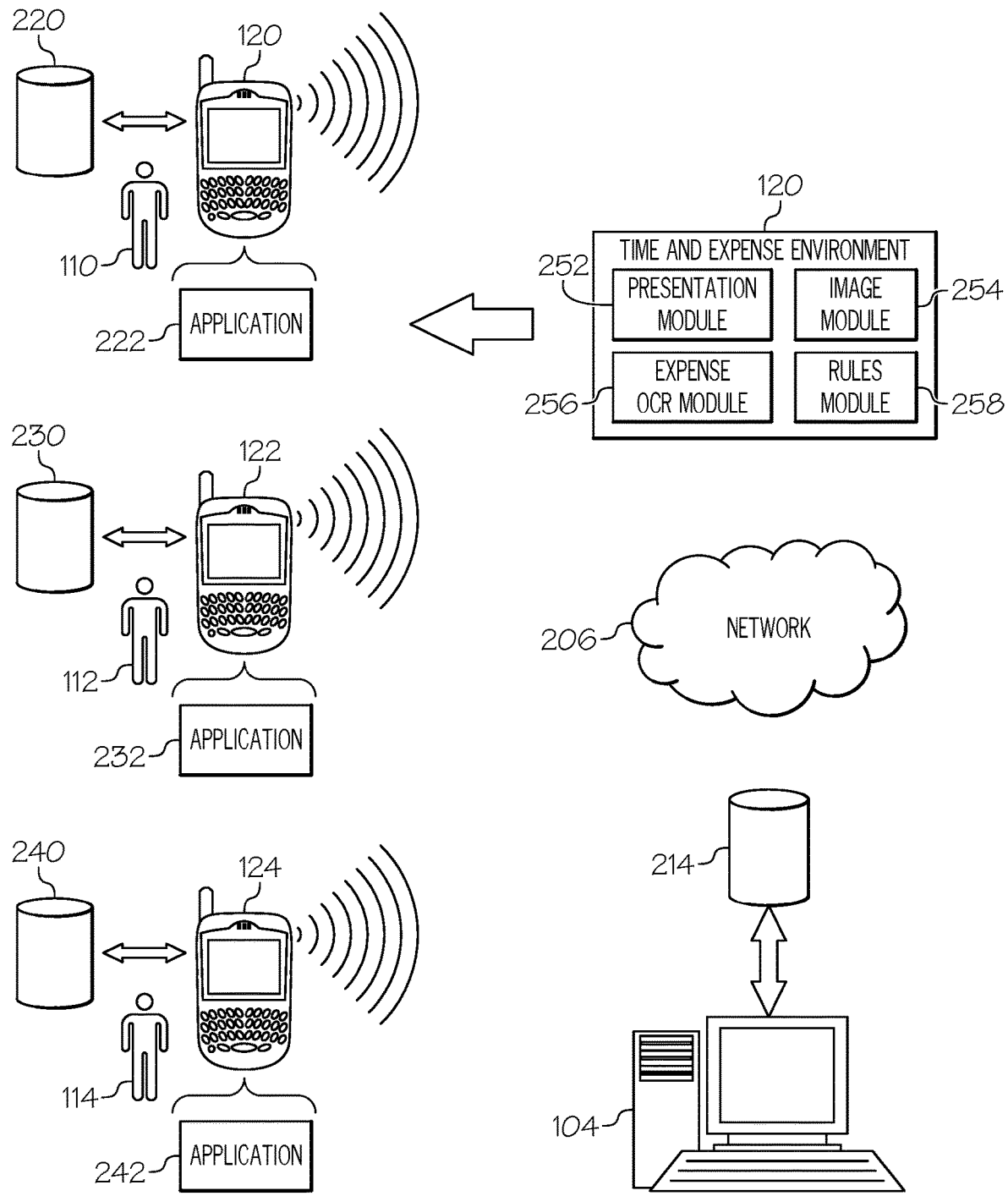
FIG. 2 illustrates a time and expense major software components on handheld device and communicating with computer server, according to an example.

FIG. 2 illustrates a time and expense major software components on handheld device and communicating with computer server 104 of FIG. 1. The callout item numbers beginning with "1" refers to identical or functionally similar elements previously described above with reference to FIG. 1. More specifically, the communication devices 120, 122, and 124 each include at least one database 220, 230, 240 and an app or application 222, 232, 242. One example of a software app with the backend infrastructure for electrical utility repair is the iStorm™ system created by the NextEra Energy. Each application 222, 232, 242 includes several major software modules 250 as follows:

- Presentation Module 252—that enables the user 120, 122, 124 to interact with various screens as further described below.
- Image Module 254—which interfaces with cameras on the communication devices 120, 122, 124 to document the faces of the members, the materials, the receipts, and the vehicles being used. The image module includes facial recognition software for validating a worker. The image module may also include object recognition software to help identify components of the utility distribution system. Further, the image module may include character recognition software to allow serial numbers, licensing plates and other characters to be recognized.
- Expense OCR module 256—which includes optical character recognition (OCR) software for analyzing an image of a receipt, reading barcodes and OR codes. The software tallying items on a receipt and compares the tally to the total of the receipt to ensure each item listed matches the total sum.
- Rules Module 258—which include business and business rules for each member, each crew and subcategories such as work time (WT), overtime (OT), double time (DT), for activities such as working, traveling, and standby.

It is important to note that although reference is made to software apps on communication devices, the present invention can be implemented as a web-based interface presenting a series of webpages to the user as well. The webpages like the app may be designed to cache data and apply some rules locally in the event communications between the communication devices and the webserver is not available.

Data Structure

FIG. 3 is a table 300 of example data for time and expense tracking, according to an example. The table includes rows for each member 1, member 2, through member N. In this table 300 the data includes rules for Standard Time (ST) or Work Time (WT), Overtime (OT), and Double Time (DT). These rules may include, authorized members or workers, authorized start date and end date, authorized location(s); authorized maximum Standard Time (ST) per day, per week, per pay period, maximum overtime (OT) per day, per week, per pay period, Double Time (DT) per day, per week, per pay period, caps on expenses per day, per week, per pay period, authorized job descriptions, authorized expense categories and more.

Flow Diagrams and User Interface Screens

Figure 4:
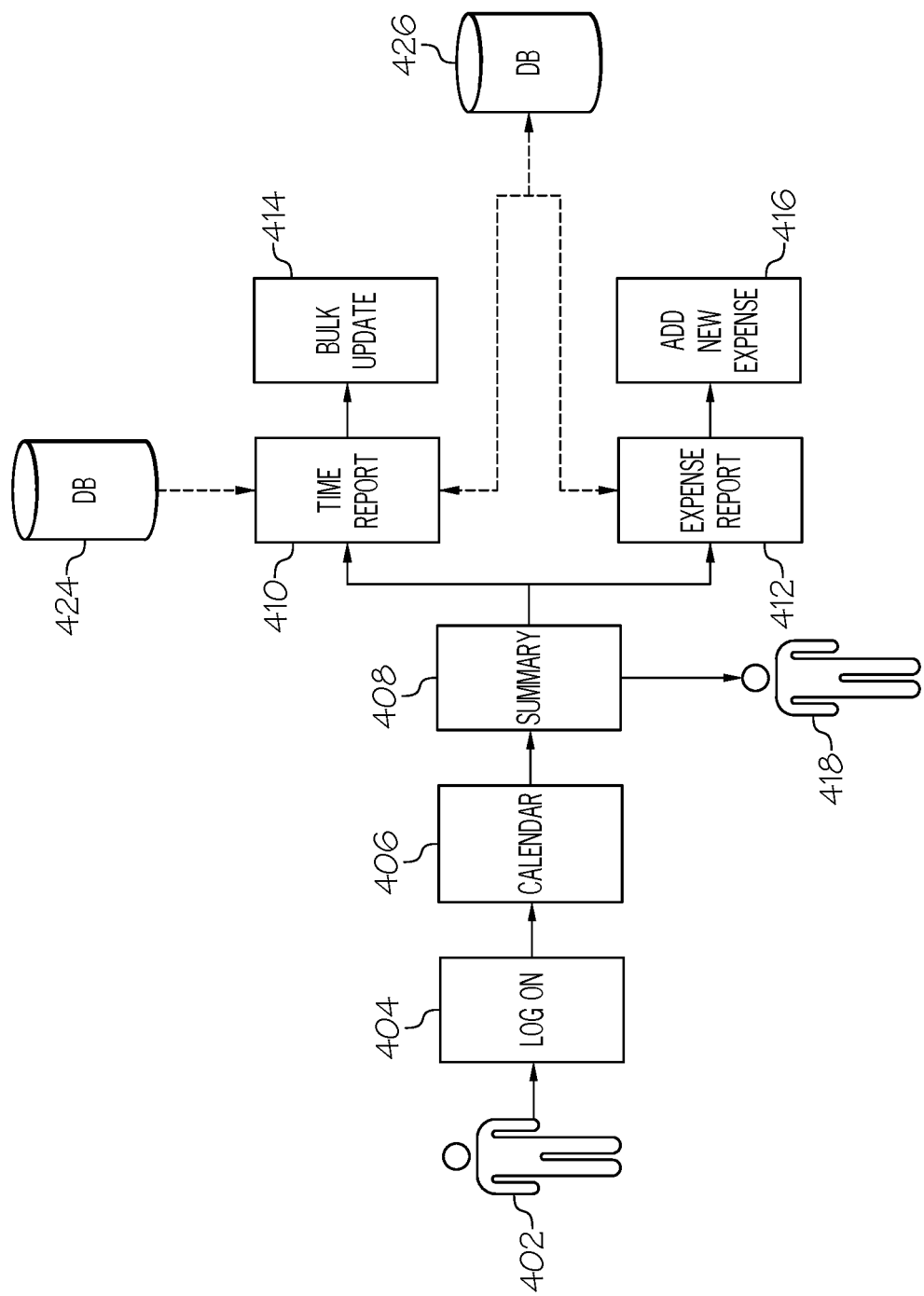
FIG. 4 is an example flow of the time and entry process, according to an example.

FIG. 4 is an example flow of the time and entry process, according to an example. This description will refer to FIG. 7 through FIG. 16 are example screens of the time and entry process, according to an example.

The overall flow shown in FIG. 4 starts from the left side with the Team Lead 402 of a given crew logging in 404 and being presented a calendar screen 406. A summary page 408 is shown before the time entries and/or expense entries are submitted for review, by Project Lead 418, to server 104 coupled to database 424. This calendar screen 406 and summary page 408 is further illustrated in FIG. 5. Time entries 410 and expense entries 412 screens for review on server 104 are shown. Prior to approval by the PL, one or more internal rules may be implied to ensure the crew member's time entries are within bounds of the rules set as shown the following figures. Once approved by Production Lead (PL) 418 these may be stored in the same database 424 or another database 426 as shown. In one example, the first database 424 is a Resources for Emergency Deployment (REDi) database that contains information to manage resources, commodities, and people which communicates with the application. The second database 426 is Contractor Time and Expense (CTE) Database 426 for collecting and storing all information related to contractor time entrees through the application 222, 232, and 242.

Figures 5A, 5B, 5C:
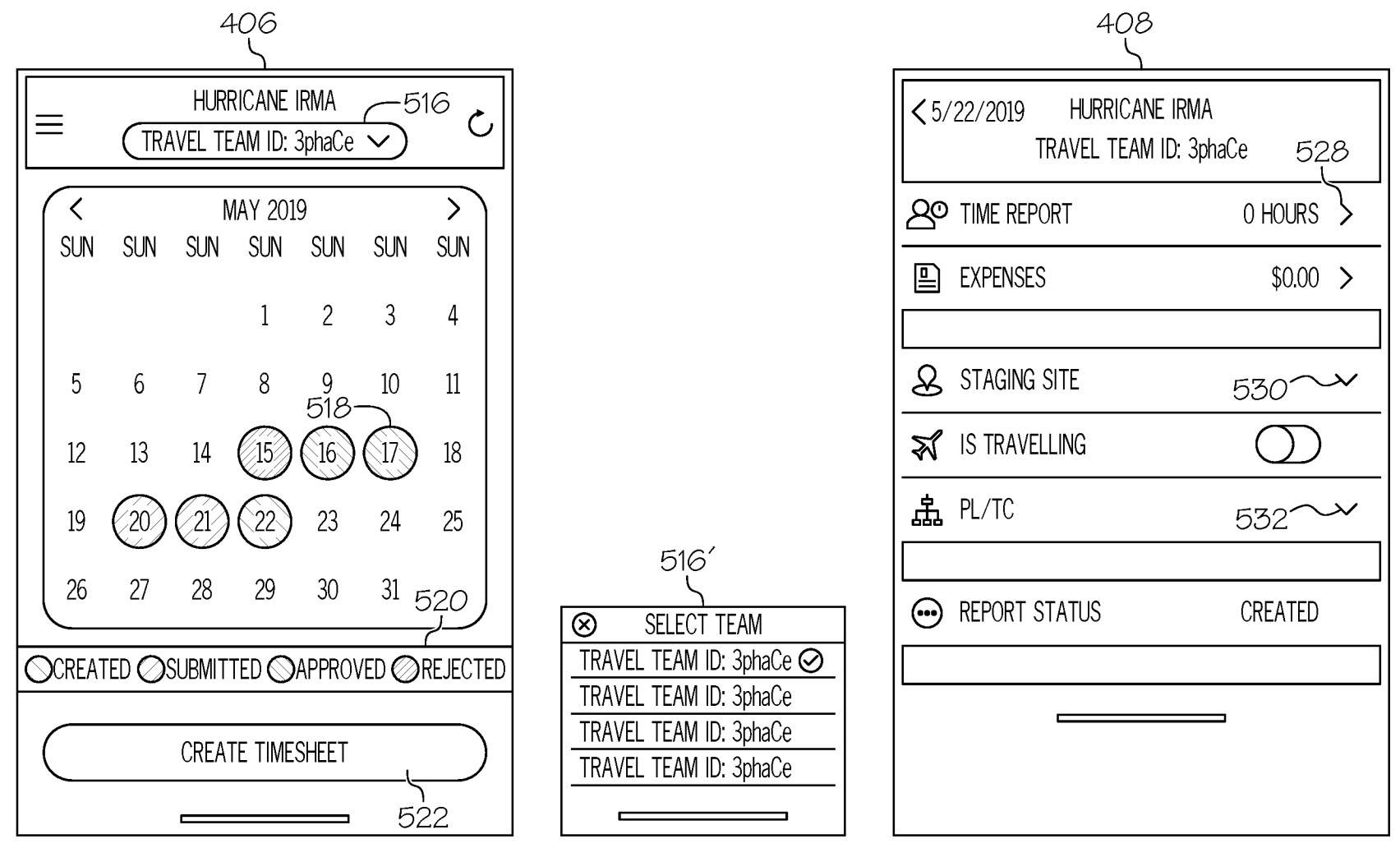

Turning now to FIG. 5A thru FIG. 5C are further details of an example calendar screen 406 and summary page 408. A pull down 516 with names of crew members, which may be pre-populated by server 104, is shown. A user selects 518 a date on calendar 408 and use of color-coded buttons for quick interpretation. Shown are colors 520 for "created", "submitted", "approved" and "rejected". Selecting button 522 creates a timesheet. The summary page 408, the "Time Report" 528 and "Staging Site" 530 and "Process Lead"/ "Travel Coordinator" 532 are required.

Figures 6A, 6B:
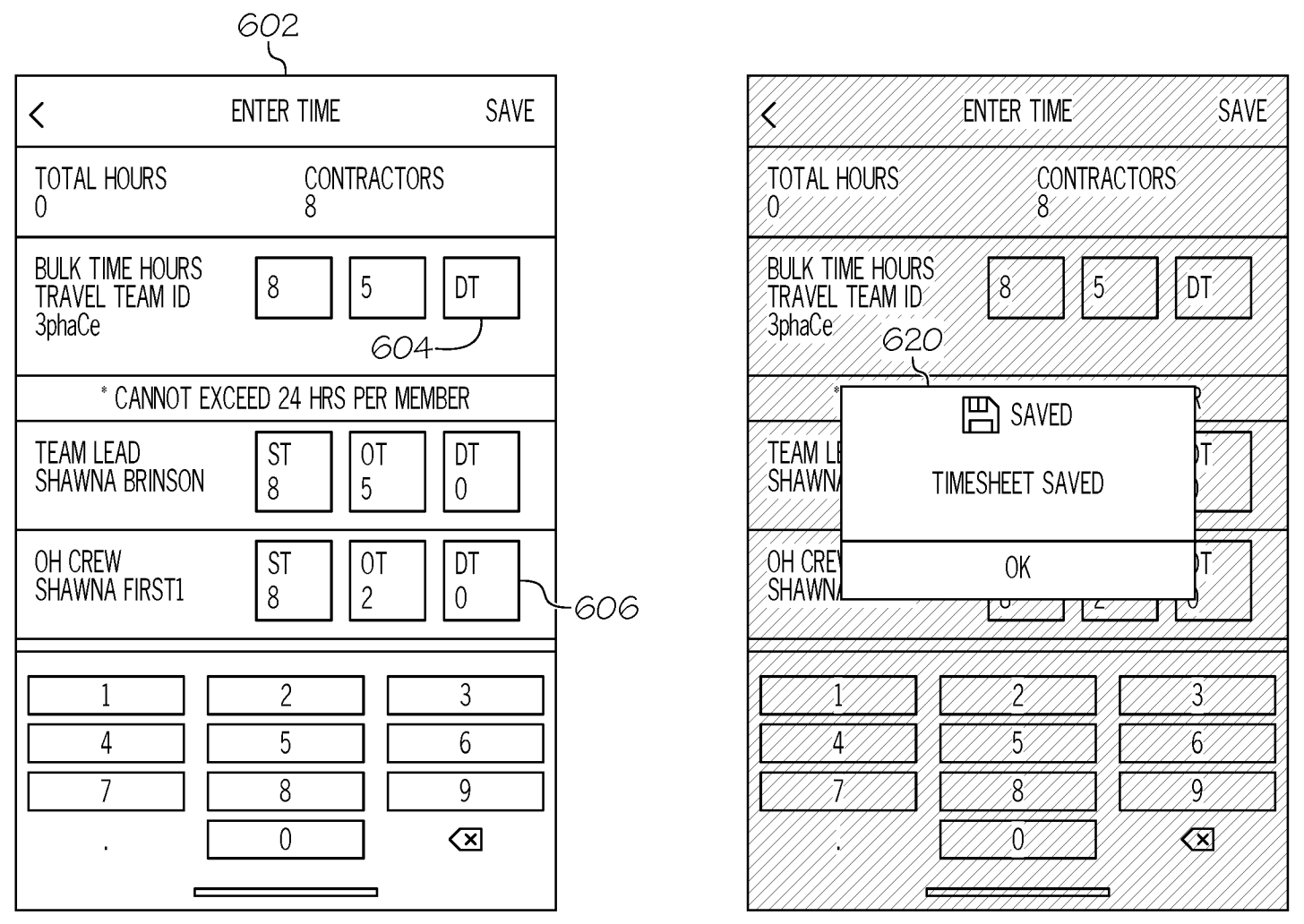

FIG. 6A thru FIG. 6B illustrates an example screen 602, which provides a single identical time entry or expense entry, also known as "bulk entry" 604 for all members of the crew. This is very helpful in reducing the number of steps that the crew lead must perform in entering, via a portable electronic device 120, 122, and 124 when entering the identical time entries and/or expense entries for the entire crew. Individual hours 606 an also be revised as needed. The entries are saved 620.

FIG. 7A thru FIG. 7C is another view of the summary page 408, according to an example. Shown is a pull-down pre-populated by server 104 for staging site 702. A mobilization, demobilization 704 selector is shown. This is useful for providing more feedback when using GPS tracking. Also shown is a pull down listing 706 representatives from a company the time entries and expense entries of the crew must be approved.

FIG. 8A thru FIG. 8E is an example summary screen 408 a screen showing optional expense entries 820. Shown are pre-populated type of expense 824, a pre-populated reason 826 and keypad 828. As described above, in one embodiment, the server 104 or portable electronic device 120, 122, 124 includes optical character recognition (OCR) software for analyzing an image of a receipt, reading barcodes and OR codes. The software tallying items on a receipt and compares the tally to the total of the receipt to ensure each item listed matches or is less than the total sum. This is part of the business rules.

Figures 9A, 9B:
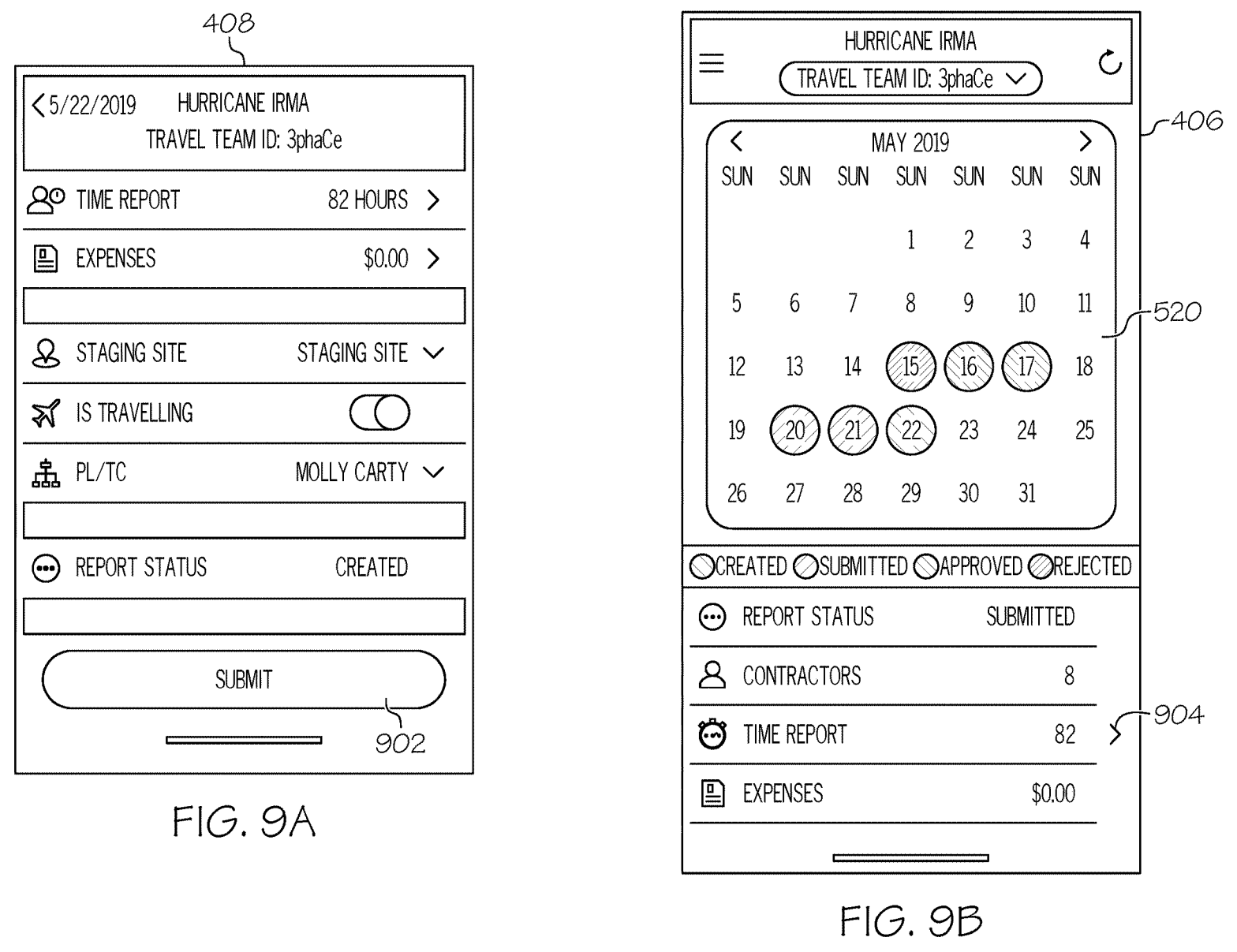

FIG. 9A thru FIG. 9B is an example screen 408 of submitted the time entries and expense entries by selecting submit button 902. The calendar 406 shows how various colors 520 are used to designate "rejected", "approved", "submitted". Also shown is a summary area 904 illustrated to show the synopsis of entries for that day.

Figures 10A, 10B, 10C:
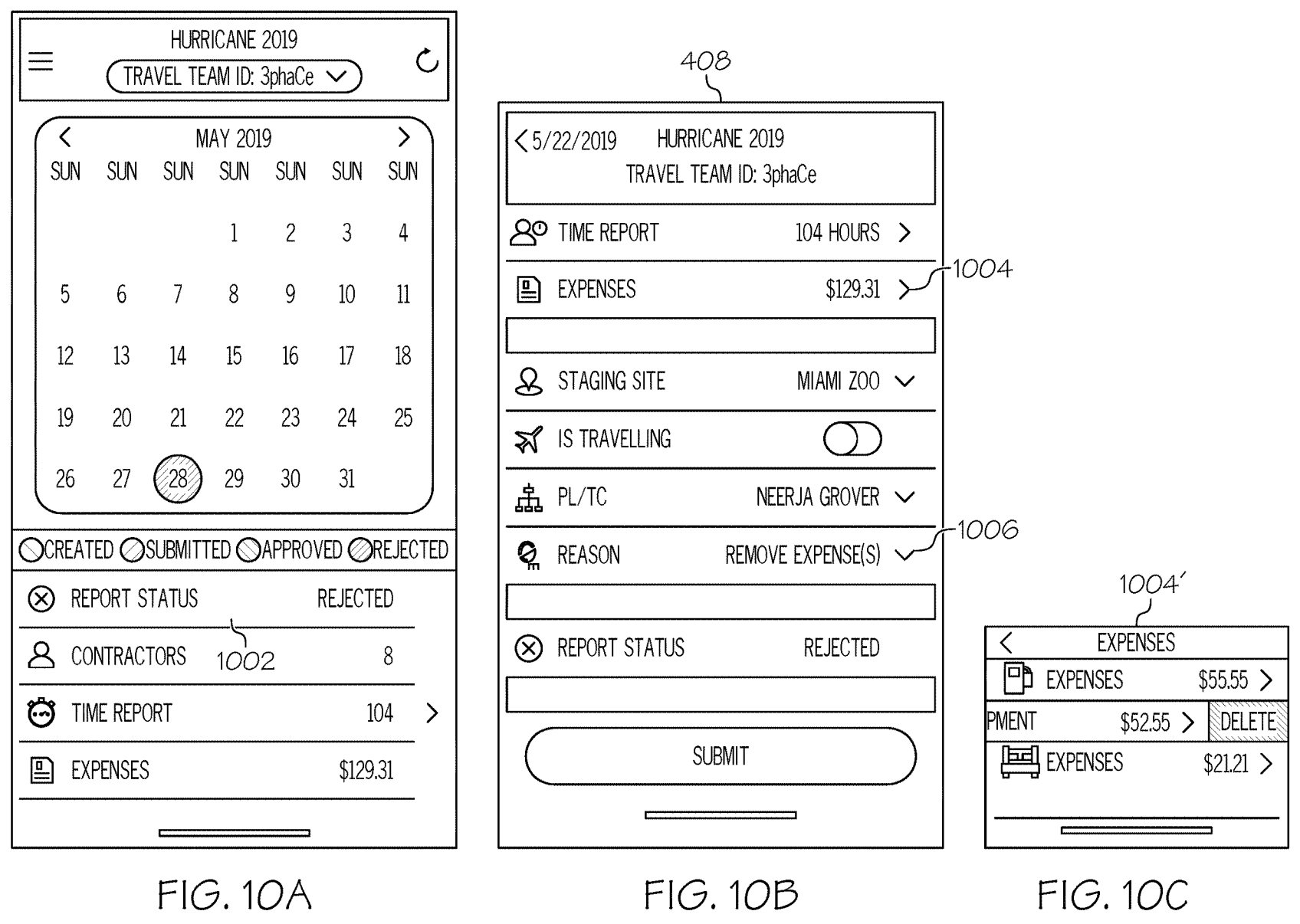

Turning to FIG. 10A thru FIG. 10C, shown in the summary area 1002 is a status of rejected timesheet. The rejection can be because of business rules applied automatically by the software on the portable electronic device 120, 122, 124, the server 104, a reviewer or a combination of all. In this example, the company's representative asked for removal of expenses 1004. The user would swipe to access a delete function and then select re-submit button 1006.

FIG. 11A thru FIG. 11B shows an example screen 1102 for timesheet approvers after the initial business rules are satisfied. Typically, this screen needs only to be "read only" because the reviewer is just approving or rejecting the time entries and or expense entries by selecting button 1104. In the event the screen is rejected, a reason must be selected as shown in 1106. For example, a reason may be remove expense.

Figures 12, 13:
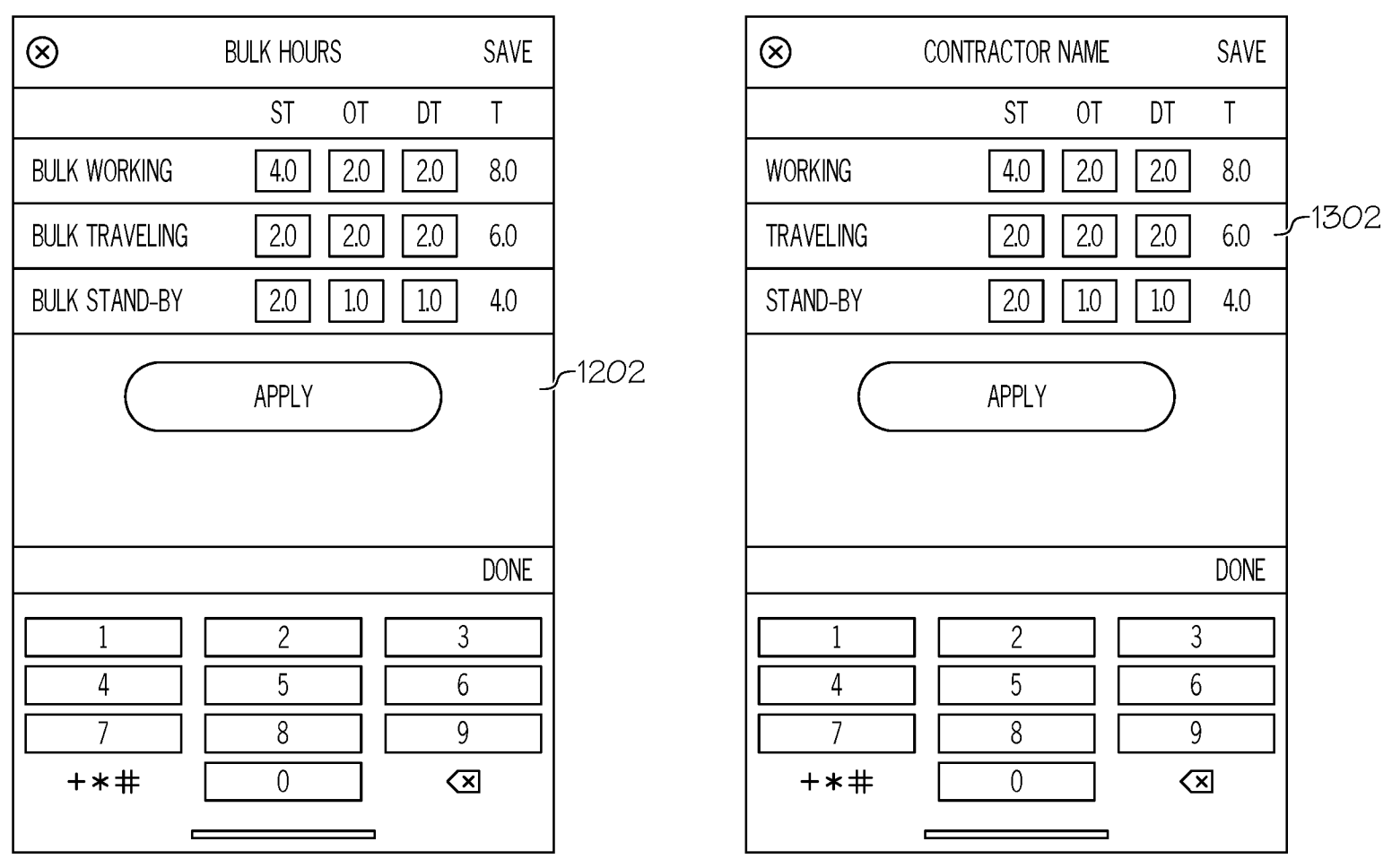

FIG. 12 is example of illustrating bulk hours of 602 of FIG. 6 in the process of being reviewed and approved by a reviewer. FIG. 13 is example of illustrating bulk hours of 602 of FIG. 6 in the process of being reviewed and approved by a reviewer. FIG. 14 is a summary of the bulk hours for the entire crew. FIG. 15A thru FIG. 15C is an example screen illustrating how bulk hours 1502 and individual is an example how individual crew members 1504 using the bulk hours of FIG. 14 can be adjusted.

Overall Flow of Time and Expense Management Submission Process

Figure 16A:
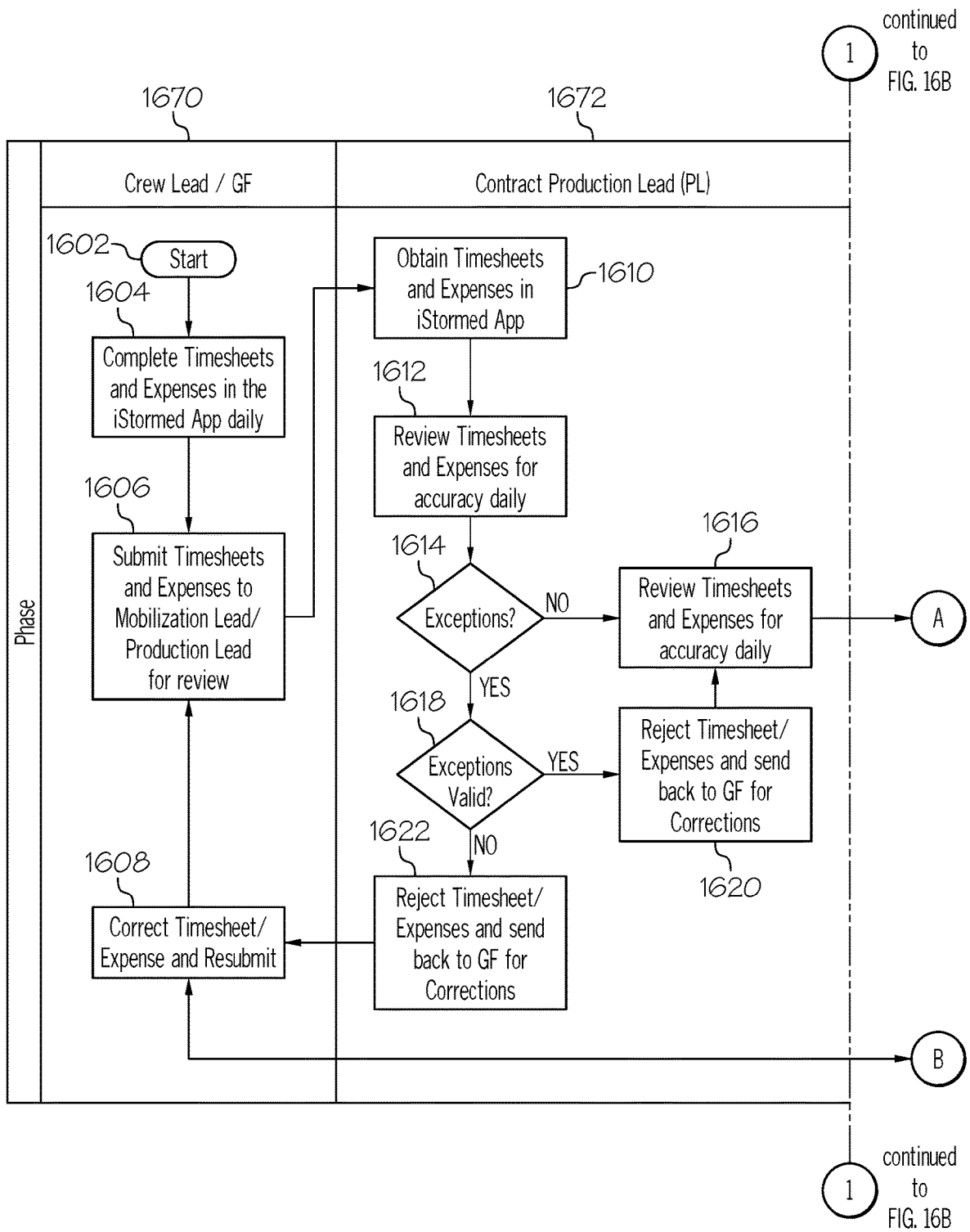
FIG. 16A thru FIG. 16B is an overall flow chart 1600 of the time and expense submission and review process.
Figure 16B:
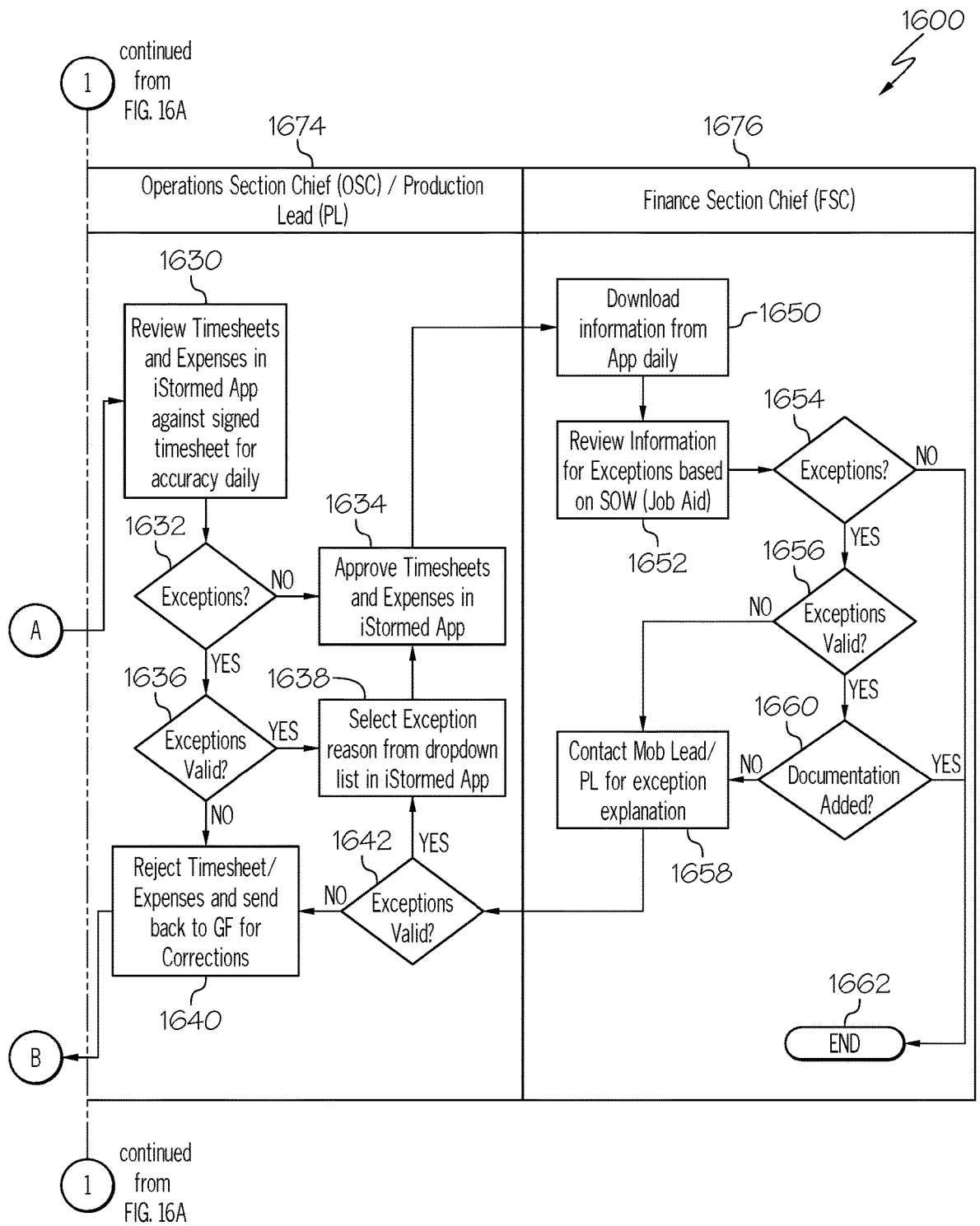

FIG. 16A thru FIG. 16B is an overall flow chart 1600 of the time and expense submission and review process, according to an example. In this example, the flow is broken into four separate areas of responsibilities of Crew Lead/GF (General Foreman) 1670, Contract Production Lead (PL) 1672, Operating Selection Chief (OSC)/Production Lead (PL) 1674 and Finance Section Chief (FSC) 1676. It is important to note that any number of areas and reviews are possible. These reviews may be automated with scripts such as XML and JAVA and other programming scripts. Some of these reviews may be manual as well as automated.

The process starts at step 1602 with the Crew Lead/GF (General Foreman) 1670 and immediately proceeds to step 1604. In step 1604, using the portable electronic device 120, 122, 124, after the verifications steps described in FIG. 17 below, the crew 110, 112, 114 enters time and/or expense entries into the application 222, 232, 242. The process continues to step 1606. In step 1606 the time and expense entries are reviewed by the Mobilization Lead/Production Lead 418. The process continues to step 1610, which typically operates on the server 104 once the time and expense entries are uploaded and the initial business rules automatically applied. Contract Production Lead (PL) 1672 retrieves time and expense entries from server 104. The process continues to step 1612 in which the time and expense entries are reviewed further using a combination of different business rules that may be automatically applied and by Contract Production Lead (PL). The process continues to step 1614 to determine if an exception is flagged due to any of the business rules or review by Contract Production Lead (PL) not being satisfied. In the event an exception has been flagged, the process continues to step 1618. The exception is reviewed to ensure it is valid based on further business rules. In the event the exception is valid, the process continues to step 1622 in which the time a test is made it the time and expense entries are rejected and automatically re-routed because to the Crew Lead/GF 1672 through steps 1608 and returning to step 1606.

Otherwise in step 1614 if there is no exception flagged the process continues to step 1616. Similarly, if in step 1618 the exception is not valid, the process continues to step 1620. In step 1620, the exception reason is documented and the process continues to step 1616. In step 1616, the time and expenses entries are forward to company representative and the process continues to step 1630.

In step 1630, Operating Selection Chief (OSC)/Production Lead (PL) 1674 retrieves the information server 104 via a web interface. Operating Selection Chief (OSC)/Production Lead (PL) 1674 reviews the time and expense entries against signed timesheets for accuracy. The process continues to step 1632. The process continues to step 1632 to determine if an exception is flagged due to any of the business rules or review by Contract Production Lead (PL) not being satisfied. In the event an exception has been flagged, the process continues to step 1636. The exception is reviewed to ensure it is valid based on further business rules. In the event the exception is valid, the process continues to step 1640 in which the time a test is made it the time and expense entries are rejected and automatically re-routed because to the Crew Lead/GF 1672 through steps 1608 and returning to step 1606.

Otherwise in step 1632, if there is no exception flagged the process continues to step 1634. Similarly, if in step 1636 the exception is not valid, the process continues to step 1638. In step 1638, the exception reason is documented and the process continues to step 1632. In step 1632, the time and expenses entries are forward to Finance Section Chief (FSC) 1676 and the process continues to step 1650.

In step 1650, the Finance Section Chief (FSC) 1676 retrieves the information server 104 via a web interface. The process continues to step 1652 in which any exceptions are reviewed on a statement of work (SOW) and continues to step 1654. In step 1654 a test is made to determine if any exceptions have been flagged. In the event no exception is flagged, the process ends in step 1662. Otherwise, in the event an exception is flagged the process continues to step 1656. In step 1656, a test is performed to see if any of these exceptions are valid. In the event the exceptions are not valid, the process continues to step 1658 in which the explanation for the exception is documents and returns to step 1642 as shown. Otherwise, if the exception is valid, the exception is added and the process ends in step 1662.

Overall Flow of Time and Expense Management Interface

Figure 17:
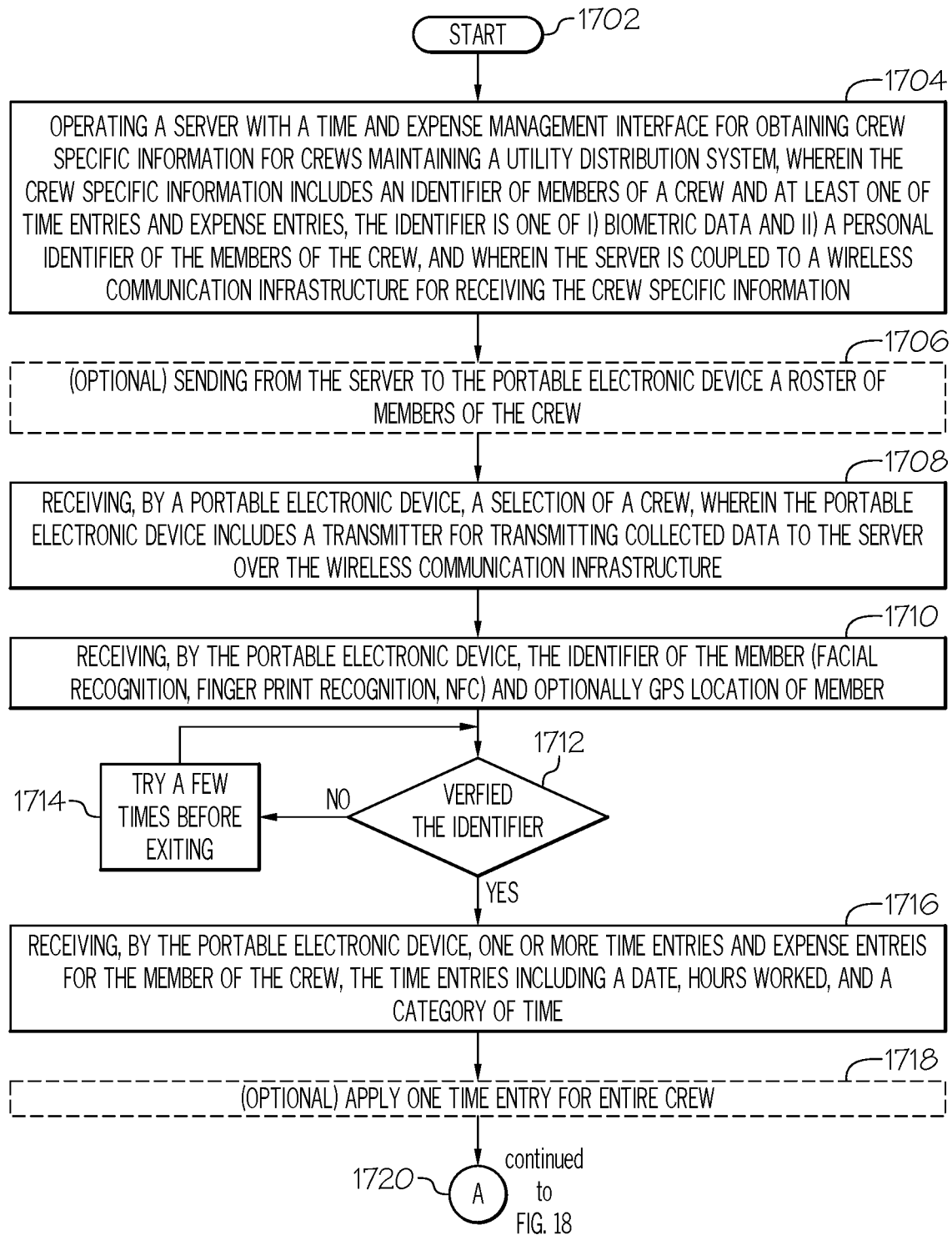
FIGS. 17 and 18 are an overall flow chart of process of operating the time and expense management interface with information received wirelessly from the portable electronic devices, according to an example.
Figure 18:
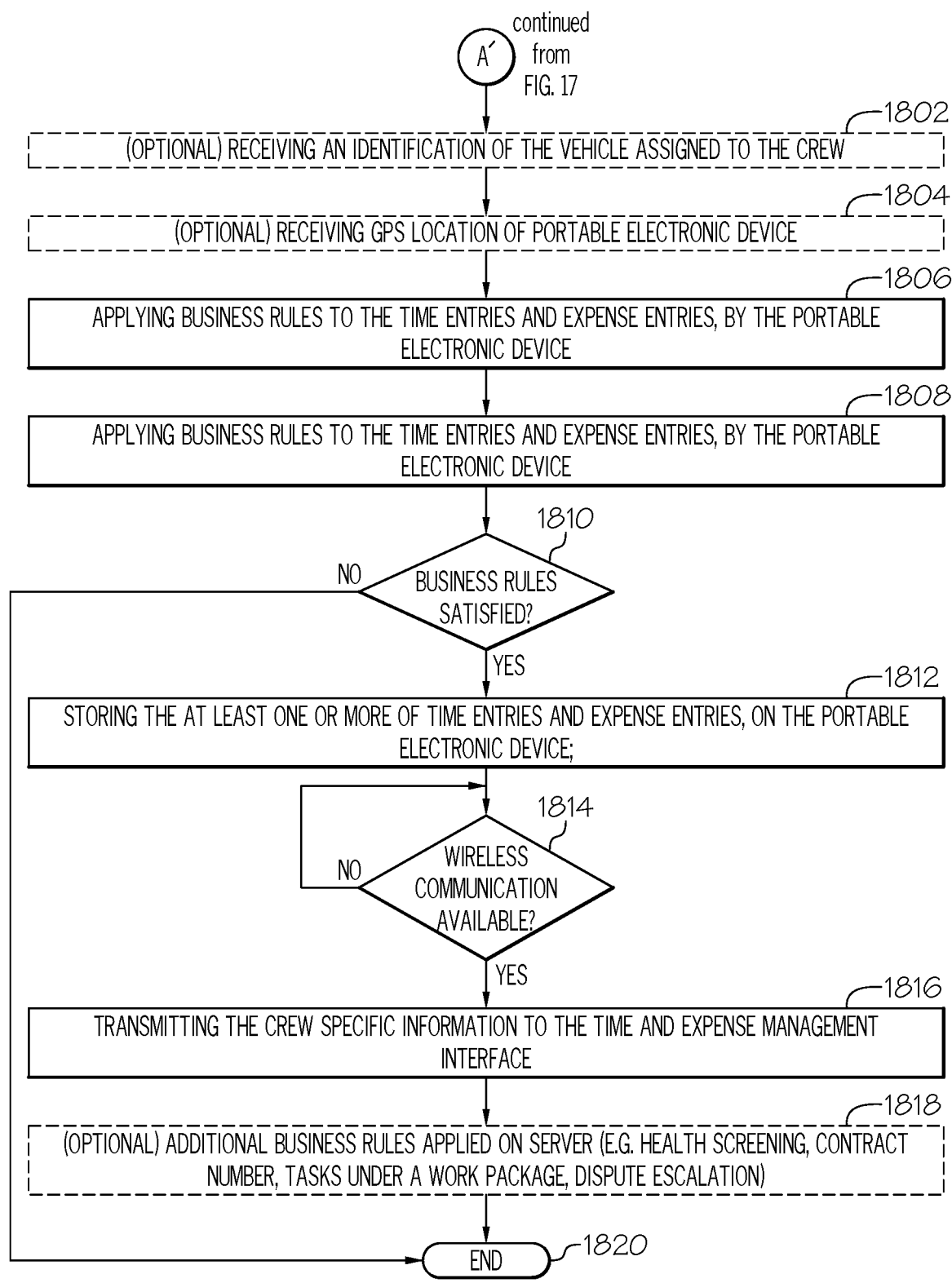

FIGS. 17 and 18 are an overall flow chart of process of operating the time and expense management interface with information received wirelessly from the portable electronic devices, according to an example. The process begins as step 1702 and immediately proceeds to step 1704. In step 1704, the system 100 shown in FIG. 1 with computer server 104 is an example environment. The computer server 104 operating the computer server 104 with a time and expense management interface (e.g. software running on the server 104) for obtaining crew specific information for crews maintaining a utility distribution system. The crew specific information includes an identifier of members of a crew and at least one of time entries and expense entries, the identifier is one of i) biometric data and ii) a personal identifier of the members of the crew. The computer server 104 is coupled to a wireless communication infrastructure 106 for receiving the crew specific information. The process continues to step 1706.

In step 1706 is an optional step. The server 104 sends to the portable electronic devices 120, 122, 124 a roster of members of the crew. The roster includes identifiers such as names, biometric data or NFC data and other data necessary for tracking time and/or expense entries. This pre-populates the app 222, 232, 242 running on the portable electronic devices 120, 122, 124 with the list of individuals working on a crew. This pre-populating not only greatly saves time, but it ensures that roster is correct and avoids misspellings or duplicate names. The process continues to step 1708.

In step 1708, the portable electronic devices 120, 122, 124, receive a selection of a crew. The process continues to step 1710. In step 1710, the portable electronic device 120, 122, 124, receives the identifier of the member. The identifier can be one or more of facial recognition, finger print recognition or near field communication of an assigned tag. Optionally the GPS location of the portable electronic device is also received. Next, the process continues to step 1712.

In step 1712, a verification test is made to see if the identifier of the members of the crew matches a previous stored identifier. In response to the verification being unsuccessful, the process may try a few times before exiting in step 1714. Otherwise if the verification of the identifier is successful, the time entries and expense entries, for the members of the crew is received. The time entries a date, hours worked, and a category of time. The process continues to step 1718.

Step 1718 is optional. All of the time entries may by through the UIs in FIG. 4 thru FIG. 15 may be applied to a sub-set or all members of the crew at once. This greatly reduces the time to document time entries needed if the entire crew is working the identical hours. The process continues to step 1724 through nodes 1720 and 1722. The process continues to step 1724.

In step 1724 an optional step of receiving an identification of crew vehicle is also received. The identification can be a license plate, VIN, or other identifier including bar codes and NFC transmitters. The process continues to step 1726.

Step 1726 is an optional step in which the GPS (global position system) location of the portable electronic device is also received. The GPS location can be used to determine that the crew is in the correct location for the period of time of the repair and corresponding to a time entry. The process continues to step 1728.

In step 1728, business rules are applied to the time entries and/or expense entries. This may be performed on the portable electronic device 120, 122, 124 or the server 102 or a combination of both. The process continues to step 1730.

In step 1730, a test is made if the business rules are satisfied. It they are not satisfied, the process continues to step 1740. As described above in FIG. 16, why there is an exception to a business rule is documented before ending in step 1730. Otherwise if the business rules are satisfied, the process continues to step 1732.

In step 1732, the time entries and/or the expense entries are stored on the portable electronic device 120, 122, 124. The process continues to step 1734.

In step 1734, the portable electronic device 120, 122, 124 may be outside cellular or wireless service due to poor coverage in a rural setting or because power to cell phone towers are not yet restored. A repeated test is made to determine if wireless communication is available. Once the portable electronic device 120, 122, 124 get in proximity to the wireless communication infrastructure 106, the crew specific information including the time entries and/or expense entries, are wirelessly transmitted to the server 102 with the time and expense management interface. The process continues to step 1738.

In step 1738, optional additional business rules running on the server 104 may be applied. These business rules could be health screen rules e.g. Covid-19 temperature, contract numbers, tasks under a work package, dispute resolution or more. The process ends in step 1740.

Portable Electronic or Handheld Device

Figure 19:
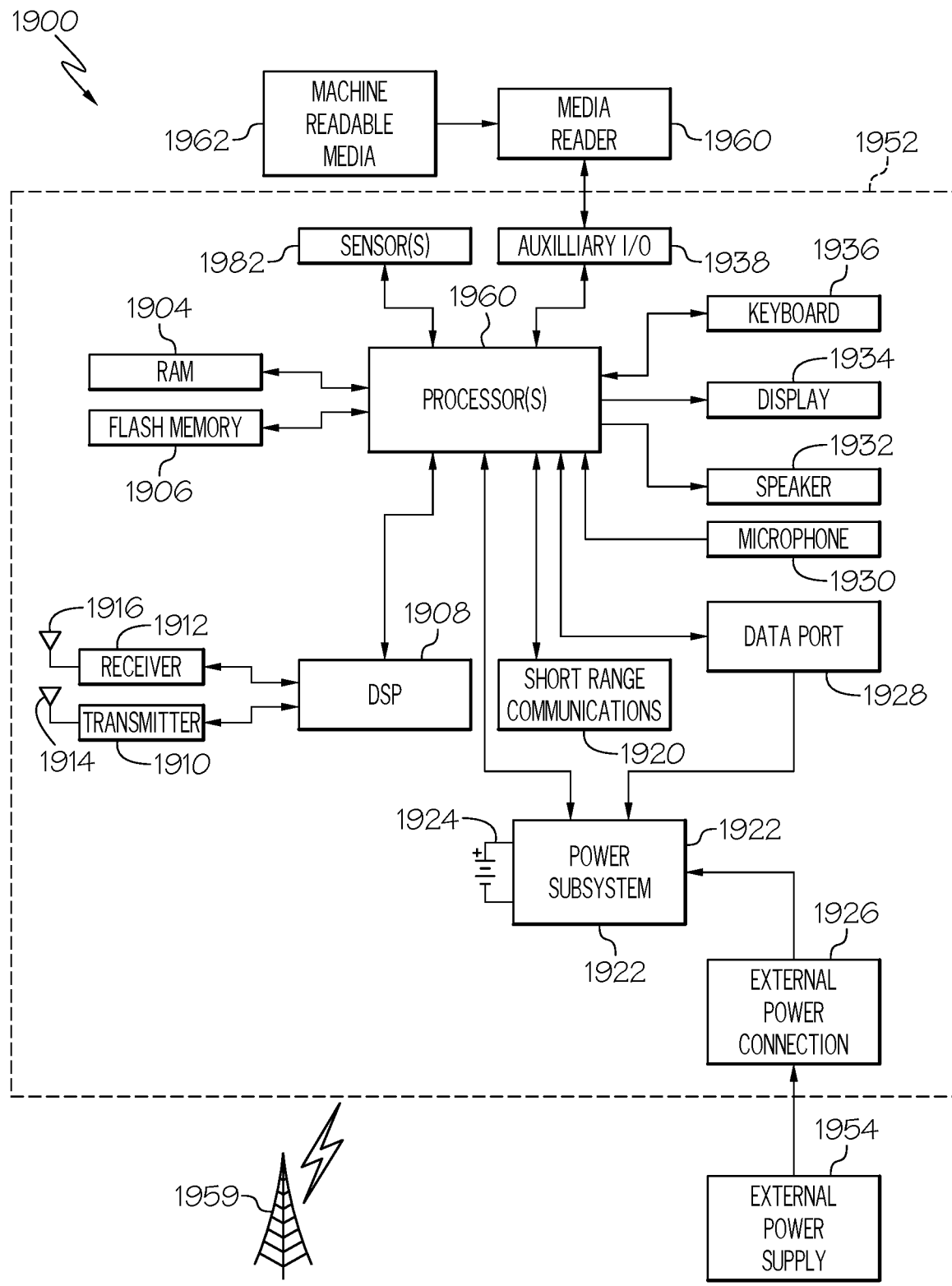
FIG. 19 is a block diagram of an example portable electronic or handheld device.

FIG. 19 is a block diagram of an example a portable electronic or handheld device 1900 that includes two-way wireless communications functions. Such handheld devices incorporate communication subsystem elements such as a wireless transmitter 1910, a wireless receiver 1912, and associated components such as one or more antenna elements 1914 and 1916. A digital signal processor (DSP) 1908 performs processing to extract data from received wireless signals and to generate signals to be transmitted. The particular design of the communication subsystem is dependent upon the communication network and associated wireless communications protocols with which the device is intended to operate.

The handheld device 1900 includes a microprocessor 1902 that controls the overall operation of the handheld device 1952. The microprocessor 1902 interacts with the above described communications subsystem elements and also interacts with other device subsystems such as non-volatile or flash memory 1906, random access memory (RAM) 1904, auxiliary input/output (I/O) device 1938, data port 1928, display 1934, keyboard 1936, speaker 1932, microphone 1930, a short-range communications subsystem 1920, a power subsystem 1922, and or any other device subsystems.

One or more sensors 1982 are incorporated into or coupled with handheld device. The sensor 1982 is operative to sense such movement by any sensing device currently known and understood within the relevant art, or hereinafter invented. Examples of sensor 1982 include one or more accelerometers, Global Positioning System (GPS), G-force meter, gravimeter, gradiometer, inclinometer, clinometer, tiltmeter, micro electro-mechanical system (MEMS), compass, or the like, using any known technology, including liquid capacitive, piezoelectric, piezoresistive, piezoceramic, or other technology currently known and understood within the relevant art, or hereinafter invented. Such devices or technology enable the conversion of movement information to an electric signal that is interpreted by microprocessor 1902.

Pairs or triplet combinations, or bi-axial or tri-axial implementations of sensor 1982 may are used for detecting movement in two or three dimensions. Sampling rates of sensor 1982 are selected to balance cost and other factors, with a requirement for the perception of responsiveness and smooth movement desired for a user. One or more accelerometers may provide information regarding a rate of speed or acceleration of a handheld device, and may also provide information pertaining to orientation of the handheld device 1900, as well. Algorithms or software which may be executed by microprocessor 1902, for converting spatial, coordinate, or other reference information embedded within such electric signal, to an angular orientation of the sensing device and/or an orientation of a device into which the sensing device is connected or associated, is understood by one skilled in the relevant art.

A battery 1924 is connected to a power subsystem 1922 to provide power to the circuits of the handheld device 1952. The power subsystem 1922 includes power distribution circuitry for providing power to the handheld device 1900 and also contains battery charging circuitry to manage recharging the battery 1924. The power subsystem 1922 includes a battery monitoring circuit that is operable to provide a status of one or more battery status indicators, such as remaining capacity, temperature, voltage, electrical current consumption, and the like, to various components of the electronic handheld 1900.

The data port 1928 is able to support data communications between the handheld device 1900 and other devices through various modes of data communications, such as high speed data transfers over optical communications circuits or over electrical data communications circuits such as a USB connection incorporated into the data port 1928 of some examples. Data port 1928 is able to support communications with, for example, an external computer or other device.

Data communication through data port 1928 enables a user to set preferences through the external device or through a software application and extends the capabilities of the device by enabling information or software exchange through direct connections between the handheld device 1952 and external data sources rather then via a wireless data communication network. In addition to data communication, the data port 1928 provides power to the power subsystem 1922 to charge the battery 1924 or to supply power to the electronic circuits, such as microprocessor 1902, of the handheld device 1900.

Operating system software used by the microprocessor 1902 is stored in flash memory 1906. Further examples are able to use a battery backed-up RAM or other non-volatile storage data elements to store operating systems, other executable programs, or both. The operating system software, device application software, or parts thereof, are able to be temporarily loaded into volatile data storage such as RAM 1904. One example of data storage in RAM is time and expense environment 250. Data received via wireless communication signals or through wired communications are also able to be stored to RAM 1904.

The microprocessor 1902, in addition to its operating system functions, is able to execute software applications on the handheld device 1900. A predetermined set of applications that control basic device operations, including at least data and voice communication applications, is able to be installed on the handheld device 1900 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the handheld device 1900 through, for example, the wireless network 1950, an auxiliary I/O device 1938, data port 1928, short-range communications subsystem 1920, or any combination of these interfaces. Such applications are then able to be installed by a user in the RAM 1904 or a non-volatile store for execution by the microprocessor 1902.

In a data communication mode, a received signal such as a text message or web page download is processed by the communication subsystem, including wireless receiver 1912 and wireless transmitter 1910, and communicated data is provided the microprocessor 1902, which is able to further process the received data for output to the display 1934, or alternatively, to an auxiliary I/O device 1938 or the data port 1928. A user of the handheld device 1952 may also compose data items, such as e-mail messages, using the keyboard 1936, which is able to include a complete alphanumeric keyboard or a telephone-type keypad, in conjunction with the display 1934 and possibly an auxiliary I/O device 1938. Such composed items are then able to be transmitted over a communication network through the communication subsystem.

For voice communications, overall operation of the handheld device 1900 is substantially similar, except that received signals are generally provided to a speaker 1932 and signals for transmission are generally produced by a microphone 1930. Alternative voice or audio I/O subsystems, such as a voice message recording subsystem, may also be implemented on the handheld device 1900. Although voice or audio signal output is generally accomplished primarily through the speaker 1932, the display 1934 may also be used to provide an indication of the identity of a calling party, the duration of a voice call, or other voice call related information, for example.

Depending on conditions or statuses of the handheld device 1900, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 1920 provides for data communication between the handheld device 1952 and different systems or devices, which need not necessarily be similar devices. For example, the short-range communications subsystem 1920 includes an infrared device and associated circuits and components or a Radio Frequency based communication module such as one supporting Bluetooth® communications, to provide for communication with similarly-enabled systems and devices, including the data file transfer communications described above.

A media reader 1960 is able to be connected to an auxiliary I/O device 1938 to allow, for example, loading computer readable program code of a computer program product into the handheld device 1900 for storage into non-volatile memory such as flash memory 1906. One example of a media reader 1960 is an optical drive such as a CD/DVD drive, which may be used to store data to and read data from a computer readable medium or storage product such as computer readable storage media 1962. Examples of suitable computer readable storage media include optical storage media such as a CD or DVD, magnetic media, or any other suitable data storage device. Media reader 1960 is alternatively able to be connected to the electronic device through the data port 1928 or computer readable program code is alternatively able to be provided to the handheld device 1900 through the wireless network 1950.

Non-Limiting Examples

Although specific examples of the subject matter have been disclosed, those having ordinary skill in the art will understand that changes can be made to the specific examples without departing from the spirit and scope of the disclosed subject matter. The scope of the disclosure is not to be restricted, therefore, to the specific examples, and it is intended that the appended claims cover any and all such applications, modifications, and examples within the scope of the present disclosure.

What is claimed is:

1. A computer-implemented method for time and expense management, the method comprising:

operating on a server, a time and expense management interface for obtaining crew specific information for a plurality of crews maintaining a utility distribution system, wherein the crew specific information includes an identifier of at least one or more members of a crew in the plurality of crews and at least one or more of time entries and expense entries, and wherein the server is coupled to a wireless communication infrastructure for receiving the crew specific information;

receiving, by a portable electronic device, a selection of a crew with the at least one or more members, wherein the portable electronic device includes at least one transmitter for transmitting collected data to the server over the wireless communication infrastructure;

receiving, by the portable electronic device, the identifier of the at least one or more members of the crew, wherein the identifier is one of i) biometric data and/or ii) a personal identifier of the at least one or more members of the crew;

verifying, by the portable electronic device, the identifier of the at least one or more members of the crew matches a previous stored identifier, wherein the identifier is one of i) biometric data and/or ii) a personal identifier of the at least one or more members of the crew;

based on the verification of the identifier matching the previous stored identifier, receiving, by the portable electronic device, the at least one or more of time entries and expense entries, for the at least one or more members of the crew, the time entries including a date, hours worked, and a category of time;

applying business rules to the at least one or more of time entries and expense entries, by the portable electronic device, wherein the business rules include work time, overtime, double time for activities of working, traveling, and standby;

based on the business rules being satisfied, storing the at least one or more of time entries and expense entries, on the portable electronic device; and based on the portable electronic device being in proximity to the wireless communication infrastructure, transmitting the crew specific information to the time and expense management interface.

2. The computer-implemented method of claim 1, further comprising:
sending, from the server to the portable electronic device, a roster of members of the crew prior to receiving on the portable electronic device the selection of the crew.

3. The computer-implemented method of claim 1, wherein the personal identifier is based on one of
a facial recognition of the at least one or more members of the crew;
finger print recognition of the at least one or more members of the crew;
a near field communication tag assigned to the at least one or more members of the crew; or a combination thereof.

4. The computer-implemented method of claim 1, further comprising:
receiving an identification of a vehicle assigned to the at least one or more members of the crew; and wherein the business rules to the at least one or more of time entries and expense entries, include comparing the identification of a vehicle to an authorized vehicle.

5. The computer-implemented method of claim 1, wherein receiving the personal identifier of the at least one or more members of the crew, includes receiving a GPS location of the portable electronic device and wherein the business rules to the at least one or more of time entries, and expense entries, include comparing the GPS location of the portable electronic device to authorized GPS locations.

6. The computer-implemented method of claim 5, further comprising:
tracking a GPS location of the portable electronic device over a time period;
calculating a distance traveled during the time period;
receiving at least one expense entry for miles traveled by a crew vehicle;
comparing the expense entry for miles traveled by the crew vehicle to the distance traveled; and
based on the expense entry for miles being less than or equal to the distance traveled, applying business rules to the expense entries.

7. The computer-implemented method of claim 5, further comprising:
tracking a GPS location of the portable electronic device over a time period; and
calculating an estimated time of arrival to a destination of the crew.

8. The computer-implemented method for time management, of claim 1, wherein the category of time is selected from one of work time, travel time and standby time.

9. The computer-implemented method of claim 1, further comprising:
based on receiving by the server from the portable electronic device the crew specific information applying one or more additional business rules on the server, wherein the additional business rules include at least one or more of
health screening data including body temperature and wellness information of the crew to reduce transmission of a virus to predefined thresholds;
matching the identifier with a contract number;
matching a series of tasks under a work package with the crew specific information; and
beginning a dispute escalation process if a business rule is not satisfied.

10. The computer-implemented method of claim 1, further comprising:
receiving at least one expense entry for the at least one or more members of the crew, the expense entry including an image of a receipt corresponding to the expense entry;
performing text recognition on the receipt to identify one or more items each with a corresponding price;
adding the corresponding price of the one or more items on the receipt to calculate a total;
comparing the total with the expense entry; and
based on the expense entry be less than or equal to the total, applying business rules to the expense entries.

11. The computer-implemented method of claim 1, wherein the receiving, by the portable electronic device, one or more time entries for the at least one or more of the members of the crew, includes a single time entry for all members of the crew and receiving confirmation to apply the single time entry received to all members of the crew.

12. The computer-implemented method of claim 1, further comprising:
receiving a selection for a site visited by the crew and applying business rules to the site visited.

13. The computer-implemented method of claim 1, further comprising:
presenting a calendar on the portable electronic device in which a date corresponding to a time entry that has complies with the business rules applied is displayed in a first color and each time entry that does not comply with the business rules is displayed in a second color.

14. The computer-implemented method of claim 13, further comprising:
presenting a calendar on the portable electronic device in which a date corresponding to a time entry that has complies with the business rules applied and is authorized is displayed in the first color and each time entry that has complies with the business rules applied and is waiting authorization is displayed in a third color.

15. A system for time and expense management, the system comprising:
a memory with program instructions;
a processor communicatively coupled to the memory, wherein the program instructions when executed by the processor is configured causes the processor to perform the steps of
operating on a server, a time and expense management interface for obtaining crew specific information for a plurality of crews maintaining a utility distribution system, wherein the crew specific information includes an identifier of at least one or more members of a crew in the plurality of crews and at least one or more of time entries and expense entries, and wherein the server is coupled to a wireless communication infrastructure for receiving the crew specific information;
receiving, by a portable electronic device, a selection of a crew with the at least one or more members, wherein the portable electronic device includes at least one transmitter for transmitting collected data to the server over the wireless communication infrastructure;
receiving, by the portable electronic device, the identifier of the at least one or more members of the crew, wherein the identifier is one of i) biometric data and/or ii) a personal identifier of the at least one or more members of the crew;
verifying, by the portable electronic device, the identifier of the at least one or more members of the crew matches a previous stored identifier, wherein the identifier is one of i) biometric data and/or ii) a personal identifier of the at least one or more members of the crew;
based on the verification of the identifier matching the previous stored identifier, receiving, by the portable electronic device, the at least one or more of time entries and expense entries, for the at least one or more members of the crew, the time entries including a date, hours worked, and a category of time;
applying business rules to the at least one or more of time entries and expense entries, by the portable electronic device, wherein the business rules include work time, overtime, double time for activities of working, traveling, and standby;
based on the business rules being satisfied, storing the at least one or more of time entries and expense entries, on the portable electronic device; and
based on the portable electronic device being in proximity to the wireless communication infrastructure, transmitting the crew specific information to the time and expense management interface.

16. The system of claim 15, further comprising:
sending, from the server to the portable electronic device, a roster of members of the crew prior to receiving on the portable electronic device the selection of the crew.

17. The system of claim 15, wherein the personal identifier is based on one of
a facial recognition of the at least one or more members of the crew;
finger print recognition of the at least one or more members of the crew;
a near field communication tag assigned to the at least one or more members of the crew; or a combination thereof.

18. The system of claim 15, further comprising:
receiving an identification of a vehicle assigned to the at least one or more members of the crew; and wherein the business rules to the at least one or more of time entries and expense entries, include comparing the identification of a vehicle to an authorized vehicle.

19. The system of claim 15, wherein receiving the personal identifier of the at least one or more members of the crew, includes receiving a GPS location of the portable electronic device and wherein the business rules to the at least one or more of time entries, and expense entries, include comparing the GPS location of the portable electronic device to authorized GPS locations.

20. The method of claim 1, further comprising:
tracking, by the server, at least one or more of 1) expense receipts for fuel and 2) a GPS location of the portable electronic device over a time period to determine fuel consumption of a crew vehicle; and
based on the fuel consumption being above a threshold, performing, by the server, at least one or more of
1) Automatically dispatching a fuel truck to meet the crew vehicle,
2) upon the crew vehicle returning to a staging area automatically sending a control signal to sorting station to direct the crew vehicle for refueling, and
3) automatically ordering more fuel and dispatching a fuel truck.

* * * * *